(12) United States Patent
Johnson et al.

(10) Patent No.: US 10,637,669 B2
(45) Date of Patent: Apr. 28, 2020

(54) DATA AND DATA LINEAGE CONTROL, TRACKING, AND VERIFICATION

(71) Applicant: Guardtime IP Holdings Limited, Tortola (VG)

(72) Inventors: Matthew Johnson, Alexandria, VA (US); Garrett Day, Arlington, VA (US); Gregory Raymond, Arlington, VA (US); Hema Krishnamurthy, Phoenix, AZ (US)

(73) Assignee: Guardtime SA, Lausanne (CH)

( * ) Notice: Subject to any disclaimer, the term of this patent is extended or adjusted under 35 U.S.C. 154(b) by 258 days.

(21) Appl. No.: 15/904,336

(22) Filed: Feb. 24, 2018

(65) Prior Publication Data

US 2018/0248701 A1 Aug. 30, 2018

Related U.S. Application Data

(60) Provisional application No. 62/462,936, filed on Feb. 24, 2017.

(51) Int. Cl.
*H04L 9/32* (2006.01)

(52) U.S. Cl.
CPC .......... *H04L 9/3247* (2013.01); *H04L 9/3236* (2013.01); *H04L 9/3239* (2013.01); *H04L 9/3297* (2013.01); *H04L 9/3249* (2013.01); *H04L 9/3252* (2013.01); *H04L 9/3268* (2013.01); *H04L 2209/38* (2013.01)

(58) Field of Classification Search
CPC ..................... H04L 9/3247; H04L 9/3236
See application file for complete search history.

(56) References Cited

U.S. PATENT DOCUMENTS

| | | | | |
|---|---|---|---|---|
| 9,853,819 | B2* | 12/2017 | Truu | H04L 9/3247 |
| 2002/0157006 | A1* | 10/2002 | Narishima | G06F 21/645 |
| | | | | 713/177 |
| 2004/0010778 | A1* | 1/2004 | Kaler | G06F 9/546 |
| | | | | 717/130 |
| 2004/0225663 | A1* | 11/2004 | Wayt | G06F 16/254 |
| 2007/0157200 | A1* | 7/2007 | Hopkins | G06F 9/52 |
| | | | | 718/100 |
| 2011/0258209 | A1* | 10/2011 | Gagliardi | G06F 11/3006 |
| | | | | 707/758 |
| 2012/0203754 | A1* | 8/2012 | Biran | G06F 16/90344 |
| | | | | 707/706 |

(Continued)

Primary Examiner — Ali Shayanfar
(74) Attorney, Agent, or Firm — Jeffrey Pearce

(57) ABSTRACT

Initial data is included in a data structure such as an initial container at an initial entity, along with rules and a data signature of at least a portion of the initial data and other container contents relating to the initial entity and the initial data. Each rule defines at least one condition governing the permissible transfer and processing of the initial data by other entities in a provenance chain. Each receiving entity creates a container of its own to encapsulate received containers, and, after optional processing of its own, such as adding or altering data and rules, digital signature for its container. The digital signatures may be obtained from a hash tree-based signing infrastructure that returns data signatures enabling recomputation of a logically uppermost value of the hash tree. A lineage map of any given container may also be displayed for analysis by a user.

18 Claims, 8 Drawing Sheets

(56) References Cited

U.S. PATENT DOCUMENTS

| | | | | |
|---|---|---|---|---|
| 2013/0263283 | A1* | 10/2013 | Peterson | G06F 21/6218 726/28 |
| 2014/0172766 | A1* | 6/2014 | Van Lunteren | H04L 45/00 706/48 |
| 2015/0271158 | A1* | 9/2015 | Ronca | H04L 9/0819 713/168 |
| 2016/0048504 | A1* | 2/2016 | Narayanan | G06F 40/30 704/9 |
| 2016/0063209 | A1* | 3/2016 | Malaviya | G16H 50/50 706/12 |
| 2016/0080519 | A1* | 3/2016 | Hansen | H04L 67/2852 709/219 |
| 2016/0125069 | A1* | 5/2016 | Gagniard | G06F 16/289 707/756 |
| 2017/0054736 | A1* | 2/2017 | Krishnamurthy | H04L 63/123 |
| 2017/0163425 | A1* | 6/2017 | Kaliski, Jr. | H04L 9/3242 |
| 2017/0195810 | A1* | 7/2017 | Gonzales, Jr. | G07C 5/0816 |
| 2017/0279818 | A1* | 9/2017 | Milazzo | H04L 63/1416 |
| 2017/0329821 | A1* | 11/2017 | Agrawal | G06F 16/2282 |
| 2017/0364552 | A1* | 12/2017 | Pattanaik | G06F 16/2365 |

* cited by examiner

DATA AND DATA LINEAGE CONTROL, TRACKING, AND VERIFICATION

CROSS-REFERENCE TO RELATED APPLICATIONS

This application claims priority of U.S. Provisional Patent Application No. 62/462,936, filed 24 Feb. 2017.

BACKGROUND

As both governmental and commercial organizations modernize information technology and solutions from more "traditional" architectures and environments, data accountability, authenticity, and relevance are becoming increasingly costly and technically difficult to achieve. Current capabilities are migrating and evolving into more distributed, scalable and dynamic platforms. For example, traditionally standalone, embedded systems such as the "Internet of Things" (IoT) environment are now including vast, interconnected, cloud-based, analytical and control systems that are leveraging dynamic and highly scalable data-driven architectures. While the capabilities and systems are adapting, and evolving, many of the tools to achieve effective and efficient data accountability, authenticity, and relevance are lacking, or simply do not exist for the platforms.

Furthermore, current identity and access-management solutions aim to provide the most robust and secure mechanisms in which to authenticate and authorize users. Because it is the industry-accepted mechanism, cryptographic authentication and authorization usually represents the strongest and most secure option for enterprises. Since most enterprises and regulated organizations leverage some form of cryptographic authentication and authorization, attackers have retargeted the surface to compromise. This is usually one that is not cryptographically sound or immutable. This shift usually moves to compromising the actual identity data associated with an account or user. Once attackers can access these accounts or users, they can elevate privileges, changes roles or groups, and manipulate the access needed to perform an attack. Because this data is not cryptographically immutable, the attacker can also erase most of the evidence and triggers that he or she was actually there. Once done with the attack, the attacker can revoke privileges, delete logs and thwart efforts to monitor data. Furthermore, the remediation or forensic proof of the events that led to an attack are computationally and financially expensive, and require dedicated teams and increasingly longer times to recompile the events of attacks. The decision then has to be made, from the computationally expensive efforts, to what the known good state of the identity accounts should now be without any cryptographic proof.

Even disregarding the issues related to malicious attacks, the ability to easily track the provenance of data, and to verify it, is useful or desirable in many areas. Supply chains are just one example, but issues related to verifiable document management turn up in many other areas as well.

DESCRIPTION

The description below is divided into several main sections. First, one structure employed in embodiments for verifiably tracking data provenance is described. Second, for the sake of clarity and completeness, a particularly advantageous signature infrastructure, namely, the KSI® system provided by Guardtime AS is illustrated and summarized. Third, a data attribution system is described, which may be backed by the Guardtime signature infrastructure. Fourth, a system for identity and access management is described.

Figure 1:
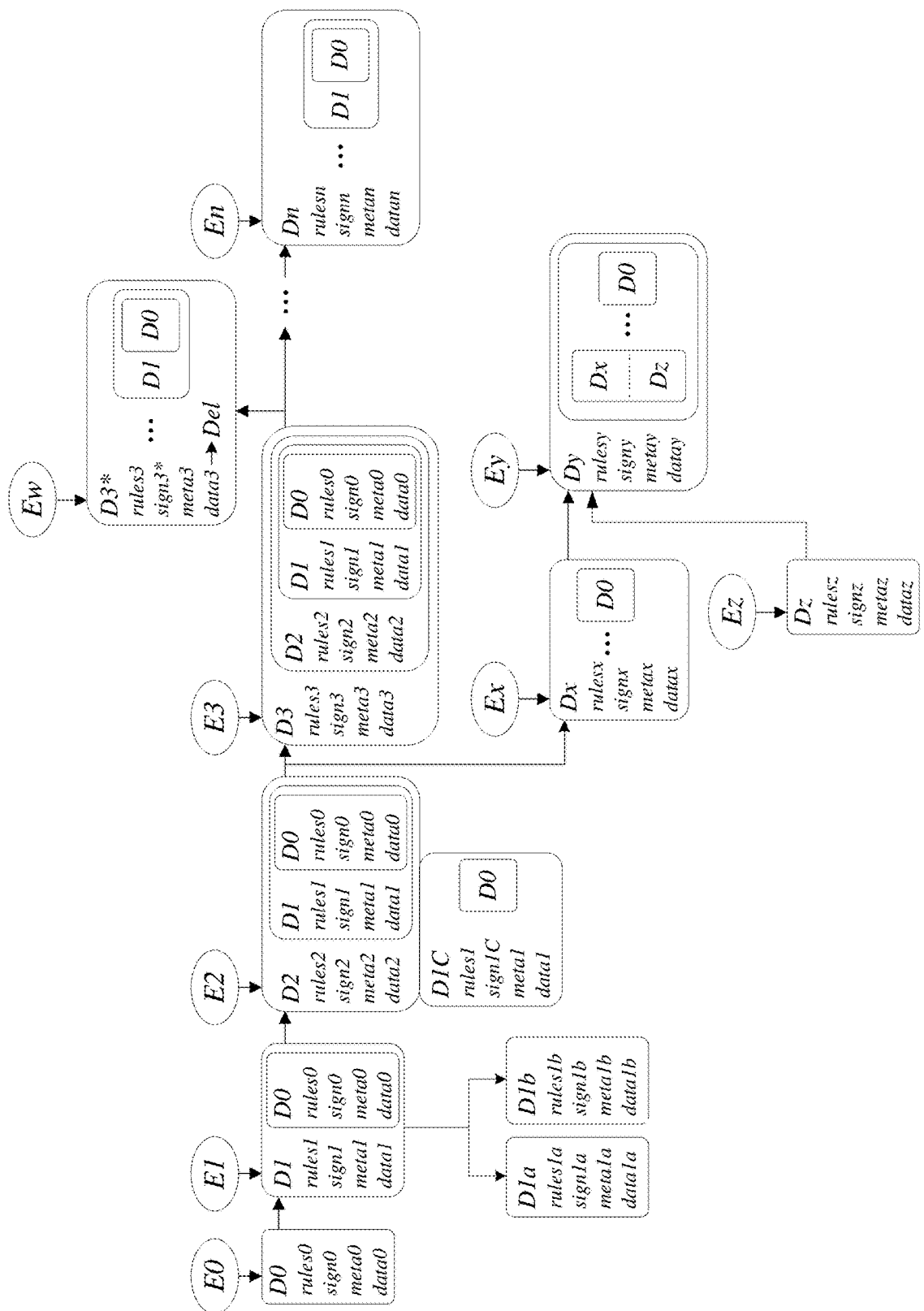
FIG. 1 illustrate one example of using nested, signed dockets to track the provenance of and manage data that is transferred between and/or transformed by various entities.

See FIG. 1, which is a simple illustration of how some entity E0 has included an initial data set data0 within a larger data structure D0 (which herein may be called a "container" or "docket" interchangeably), which comprises a body of information that may include not only data (of any type or purpose) but also, depending on the use case, executable code.

As used herein, the term "container" means a data structure that includes a plurality of elements that may be of mixed types, including, without limitation and depending on the implementation, "raw" data, metadata and, optionally, rules for handling and/or operating on the data, possibly executable code, etc. In one known definition (https://en.wikipedia.org/wiki/Container_(abstract_data_type)), a container "can be characterized by the following three properties: access, that is the way of accessing the objects of the container. In the case of arrays, access is done with the array index. In the case of stacks, access is done according to the LIFO (last in, first out) order and in the case of queues it is done according to the FIFO (first in, first out) order; storage, that is the way of storing the objects of the container; traversal, that is the way of traversing the objects of the container", and this definition specifies certain assumptions about the data structure. Although embodiments of this invention may use containers that follow such a definition, this will in many embodiments not be required; thus, "container" as used herein is not to be limited to any particular standard definition, by rather by the ability to implementation the features described below.

As shown in FIG. 1, the structure D0 includes not only the data set data0, but also metadata meta0 that E0 chooses to associate with data0, but also information rules0, expressed in any known form, defining rules for how the data0 and possibly the structure D0 as a whole may be transferred and/or changed. One other element within the structure D0 is a signature sign0, which may be for any or all of the other elements within the structure D0 but will in most implementations sign and preferably also timestamp data0. Any known data structure may be used to store and address D0, preferably so that it may be easily transferred and analyzed as a unit.

As used here, an "entity" may be any hardware and/or software component or system that is able to create and/or receive containers such as D0, or is enabled to communicate with any such system (for example, a central administrator). An entity may be a computer system such as a server, or a software construct within such a system, such as user-level processes or constructs such as an application or virtual machine, a system-level process such as any typically found within an operating system, or a hypervisor, etc., or any combination of such constructs. A single system may also comprise more than one entity; as a simple example, two different applications running on the same server might process containers derived from the same original D0. Entities may also be remote, such as in a cloud-computing environment.

Figure 3:
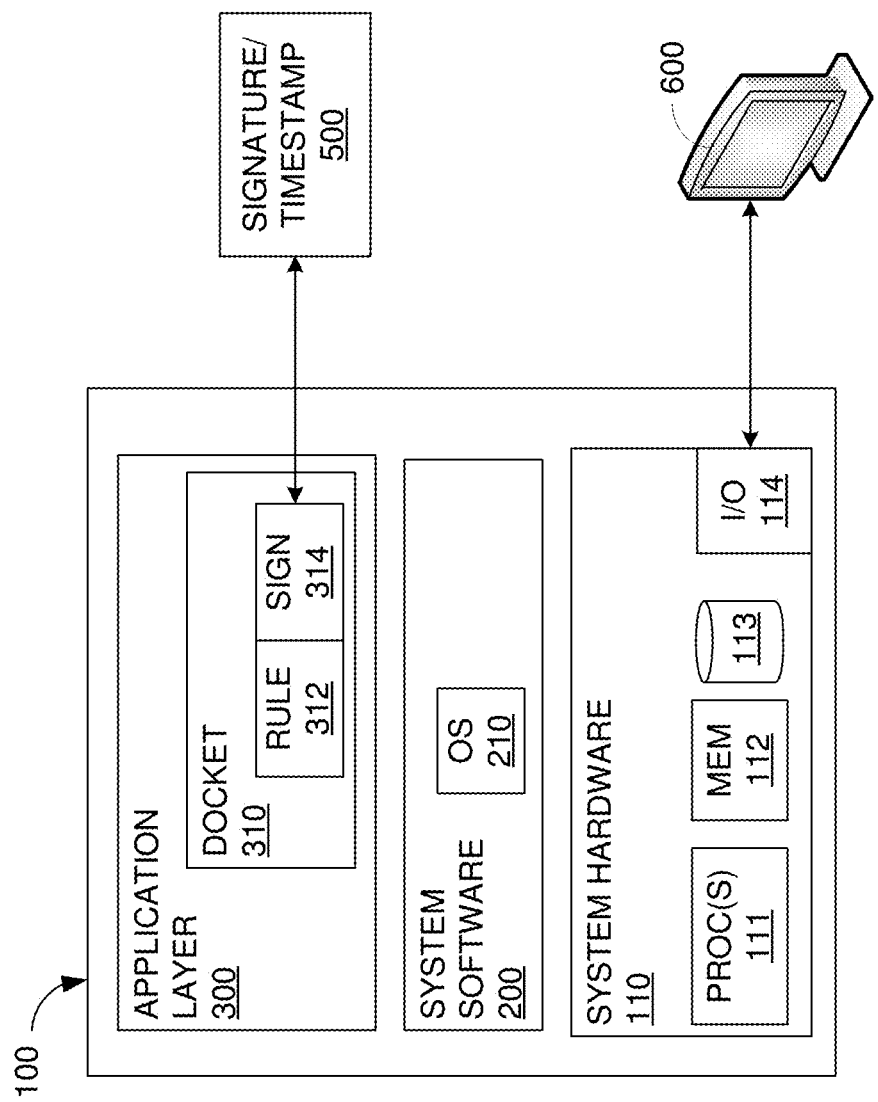
FIG. 3 shows the main hardware and software components in an entity.

See FIG. 3. In general each entity 100 will include standard components such as system hardware 110 including one or more processors 110, system software 200 such as an operating system 210 and/or virtual machine hypervisor, as well as volatile and non-volatile memory and/or storage 112, 113. The various data structures described herein, as well as the processor-executable code created to embody the software modules described below, may be stored and thus embodied in either or both types of memory/storage components (especially given the proliferation of high-speed "non-volatile" storage components, the difference between these two component classes is becoming less relevant). Standard network access components 114 may also be included in each hardware entity to enable communication and container/docket transfer between them, and to connect to and control peripherals. One or more entities may also include or connect to and control a display 600, with corresponding conventional drivers, etc., on which the provenance of a selected data asset may be viewed and examined.

Preferably (but not necessarily), a docket control software module 310 is included in an application layer 300 of each entity. This module may include sub-modules to generate (typically in response to user input via any conventional means), extract, parse and direct adherence to rules (module 312) and (module 314) to communicate with a signature and (preferably) timestamp service or component 500. The nature and purpose of the modules 312, 314, and 500 will become clear from the description below.

The initial rules rules0 (as well as any rules added downstream, as described below) may define, allow, or prohibit any chosen group of operations ("processing") on either the data (for example, data0), the container D0 as a whole, or any other part of the contained information. In short, the rules establish conditions for subsequent processing of data0. Examples of rules that might be included in a chosen implementation of embodiments of the invention include, without limitation (others are mentioned below and still others may be designed and included to satisfy the requirements for a given use):

- permitting or forbidding alteration or deletion of the data element data0 or combination of data0 with other data
- specifying what types of alteration are permitted or forbidden
- permitting or forbidding copying, that is, duplication, of data0, or of any part of data0, either at all or more than some specified number of times
- permitting or forbidding division of data0 into separately transferrable or processable portions
- specifying which entities may or may not receive any container that includes D0
- specifying physical and/or logical boundaries within which entities may or may not receive any container that includes D0; the logical or physical location of an entity may be determined using known methods, such as by examination of their IP address, known server ID, measured geolocation information (such as in mobile devices with GPS or other geolocation mechanisms), etc.
- specifying time limits or periods before, after, or during which D0 may or may not be processed
- specifying permission rules such that, for example, one or more entities or authorities or administrators must or may grant permission to carry out all or any specified set of operations on D0 or data0, either independently or according to a requirement for any definition of consensus
- specifying that certain servers must or must not have participated in creating signatures, such as using information in signatures generated using the technique described in U.S. Pat. Nos. 9,853,819 and 9,853,819, described further below Depending on the rules set by the initial entity, which may be a container creator, downstream recipients of a given container may also be permitted to add rules of their own; thus, in FIG. 1, each entity j has at least illustrated the option of adding rulesj, although this may be prohibited, in which case such rules are simply null. For example, an initial rule may be that a particular data set is transferrable to any server in a particular enterprise, but a downstream entity may add data of its own and add a rule that restricts transfer of the docket only to and among entities HR Department. Similarly, an initial rule might set a security classification of a docket to Confidential, but with a permission setting (which may also be expressed as a rule) that allows downstream entities to upgrade (but not downgrade) the classification to Secret or higher.

The rules rules0 (and subsequent) may be expressed and stored as part of the respective container using any known mechanism, either in field(s) of its own, or as additional metadata. One straightforward mechanism is to define command corresponding to each rule, which could be included in the rules element of each container as simple text, which software modules in the various entities may parse, using known techniques and carry out. In other words, one option is for each rule i to be expressed in the form:

rule_i(parameter_0, parameter_1, . . . , parameter_n), where each parameter_j may specify how the rule is to be carried out, such as (using the examples above) time limits, permission requirements, number of copies, etc. It would also be possible for one or more of the parameters to be (or point to) executable code that parsing entity is to load and execute. The only requirement is that all of the entities that are to interpret and comply with the rules include a software module to identify, parse, and carry out or direct their respective systems to carry out the rules as architected. By way of a more detailed example—but still merely by way of example—a "language" (referred to as "XDAL") is described below, which the inventors used in a prototype of an embodiment to implement various rules.

FIG. 1 illustrates a scenario in which the entity E0, which created the initial docket D0, has transferred this docket, for example, over a network, to a subsequent entity E1, which has created another docket D1, which includes additional data, metadata, and rules of its own (data1, meta1, rules1), and also includes the initial docket D0 as a subset. Any known data structure may be used to enable docket D0 to logically nest within docket D1.

It is not necessary that the entity E1 must add to or change any of the rules or data. For example entity E1 may simply wish to have and store a copy of the docket it received from entity E0. In other words, the "outer" docket D1 may simply have some form of null indicator for its rules and data or simply point to the rules and data it received as part of docket D0. Although not necessary, it may also be the case that no change is needed in the metadata meta1 relative to meta0, although such changes would be common, for example, to indicate that D1 has been created by E1, and possibly to indicate any other operations that E1 has performed, such as simple storage, with suitable location pointers or indices.

On the other hand, according to embodiments, docket D1 will receive its own signature sign1, which preferably encodes not only some portion of information specific to D1, such as rules1, meta1 and/or data1, but also at least some portion of the "inner docket" D0, for example, its signature sign01 and/or all or any part of its data data0, as well as any other information from D0 that the system designer has chosen to sign at each step. By signing not only "current" information, but also at least some portion (preferably including the data) of at least the preceding "parent" docket, any change to "inner" information (such as the data) will also be detectable: The signatures of all "inner" dockets are preferably accessible as well as the "outermost", such that any "layer" of a given docket may be verified by any entity.

Each change or transfer of docket is therefore preferably separately sign signed, since, even if no data, metadata, or rules are changed, the very fact that a new entity has received the docket represents a change of state that may be signed and preferably timestamped.

Note that no "transfer" as such is necessary to trigger creation of a new docket; rather, a single entity might create a docket, but then choose itself to process it further, as a separate operation. As another possibility, a single entity may wish to create two substantially identical (with respect to data, for example) dockets, but with different rules for sending or making accessible to different other entities, or for different internal purposes. Thus, two logically different entities Ei and Ej with respect to processing dockets may in some cases be the same logical and/or physical system or process. in FIG. 1, for example, entity E1 has split D1 into two subsets D1*a* and D1*b*, each of which then may be treated as a separate docket. One example of when this might be desirable would be when different data sub-sets are intended for transfer according to different rule sets, such as that they are to be transferred only to different groups of entities, for example, in different marketing or operational regions.

In this scenario illustrated in FIG. 1, entity E1 transfers docket D1 to a further entity E2, which similarly creates not only a new docket D2, which includes both D1 and D0 in iteratively nested fashion, but has also created a straight copy of D1 (D1C). Both D2 and D1C are then preferably signed (sign2, sign1C).

Entity E2 then transfers D2 (along with its nested inner dockets D1, D0) to entity D3 as well as to entity EX. In other words, the chain of provenance of the initial docket D0 need not follow a strictly linear path but may have branches representing multiple copies and operations. Moreover, as FIG. 1 illustrates, more than one docket may be merged into a single docket, as illustrated by entity EY receiving not only the docket DX, but also the independently and separately created docket DZ. One example of a use case in which two separate dockets might need to be merged is mapping, in which the image data may be created separately from the textual data and need to be merged into a single docket that can be analyzed both visually and textually.

Note that it is not necessary (although possible) to transfer all data datai of all entities in the preceding provenance chain path in order to represent that data in a verifiable way. For example, using the Guardtime signature scheme described below, signature requests REQ, are preferably based on transformations of the "raw" input data set. One such transformation may be compression. In many practical implementations, the requests are created by hashing the raw input data with other parameters (such as request time, requestor client ID, etc.), which itself serves to compress the data. Assume that the initial (or subsequent) data is stored in an external database but is accessible by entities. As long as the function and other parameters (which may be stored as metadata) used to transform a raw digital input record into a signature request are known, storing only the hash (or otherwise corresponding REQ) value of a given input to the signature infrastructure will suffice to enable an entity, which has downloaded the initial data, to verify that the respective data has not been altered. This will enable nesting of dockets corresponding to even large and accumulating data sets without a correspondingly large overhead. On the other hand, this embodiment has the disadvantage that containers/dockets will no longer be self-contained, with no need for an external database.

In the example shown in FIG. 1, the entity EW has received the nested docket D3, but one of the rules it received either instructed or permitted EW to delete the data that was added by entity E3. Of course, entire dockets could also be deleted, depending on the rule. Even in the case of such deletion, however, the metadata/signature shell is preferably maintained and signed, along with an indication of the operation the deletion operation that was performed. Also, even in such a case, the entity may choose to add additional rules rules3; for example, part of these rules might specify whether the deleted data may be restored or not.

Dockets may be passed from entity to entity according to any path or paths, which could even include loops. For example, the initial entity E0 might receive back from a final (or intermediate) entity EN the results of the chain of transfers and processes, such that E0 includes not only its initial docket D0, but a further docket in which D0 might be the innermost nested docket of a chain of provenance.

Note that the dockets may be structured so as to be essentially self-contained, with no need to refer to any external database or higher authority, although this would be a possibility. Moreover, depending on the nature of the signature scheme used to generate the signatures, not only may any tampering at any stage be detectable, but any docket could also be independently authenticated based on its signature. As such, using any suitable user interface, the user of an entity, such as E3, would be able to select any of the dockets included in the docket D3 that it has received and not only examine the data at each stage, but also what operations were permitted and were actually carried out at each change of state of the data, which entities participated in creating the docket D3, etc., and may also independently verify all of this information, depending upon the chosen signature scheme. In short, users are able to receive not only data according to rules, but also receive information sufficient to track the provenance of the data, even from inception, and to verify everything that has occurred that is related to the data.

Signature Infrastructure

Embodiments may use any preferred signature mechanism to create the various signatures sign. As particularly advantageous signature and timestamping mechanism is the distributed, hash tree-based signing infrastructure (the "Guardtime infrastructure") provided by Guardtime AS of Tallinn, Estonia, which is disclosed in U.S. Pat. No. 8,719,576 (also Buldas, et al., "Document verification with distributed calendar infrastructure"), which are incorporated herein by reference. This Guardtime signature infrastructure (and any subsequent improvements to it) is also referred to below as "GSI".

The GSI system comprises two components that, when combined, associate immutable properties with data. The data assets can then be distributed and validated independently by any entity across boundaries or authority enclaves. The first pillar of the GSI system is the signatures, summarized above. GSI signatures provide the basic function of assigning a data signer, authenticity of the data, and time of signing to a data asset. This may be represented by encoding the hash of the data to be signed in the signature, for example, in forming the request REQ. The data being signed can be anything in a digital format, from a video file, a virtual disk image, access control messages, satellite payloads, in short, any data set.

The second pillar of the GSI system is the "Infrastructure" stack. This provides a highly redundant, distributed, and secure platform that entities can leverage to access and participate in the cryptographic signing events. This stack can be distributed to an individual customer premise, or leveraged in a managed service or cloud approach depending on customer requirements and use case. Because of the combination of both the cryptographic signing events and this distributed infrastructure, multiple customers can leverage the same widely witnessed GSI with no overlap in infrastructure if needed, while still having the ability to cryptographically verify the other entities' data when needed, creating a true cross-boundary trust mechanism. This provides distributed data validation to previously "siloed" architectures. Previously, entities were required to be part of a trusted community, such as an authorized member of a Public Key Infrastructure or Active Directory Domain, to verify trust. Use of the GSI system, however, enables a distributed, widely witnessed trust anchor backed by a proprietary, permission-based blockchain technology. This provides the ability for a verifying entity to verify who signed the data, what the data should be, and what time the data was signed, without explicitly knowing the entity sending the data. With this, completely agnostic and independent data verification is possible.

Unlike more commercial, financial-based blockchain deployments such as Bitcoin, GSI may be configured to be permission-based, meaning signing entities must authenticate to the infrastructure before signing, as opposed being based on a "proof of work" scheme. Individual signatures can, moreover, be created for each data asset in real time.

Figure 2:
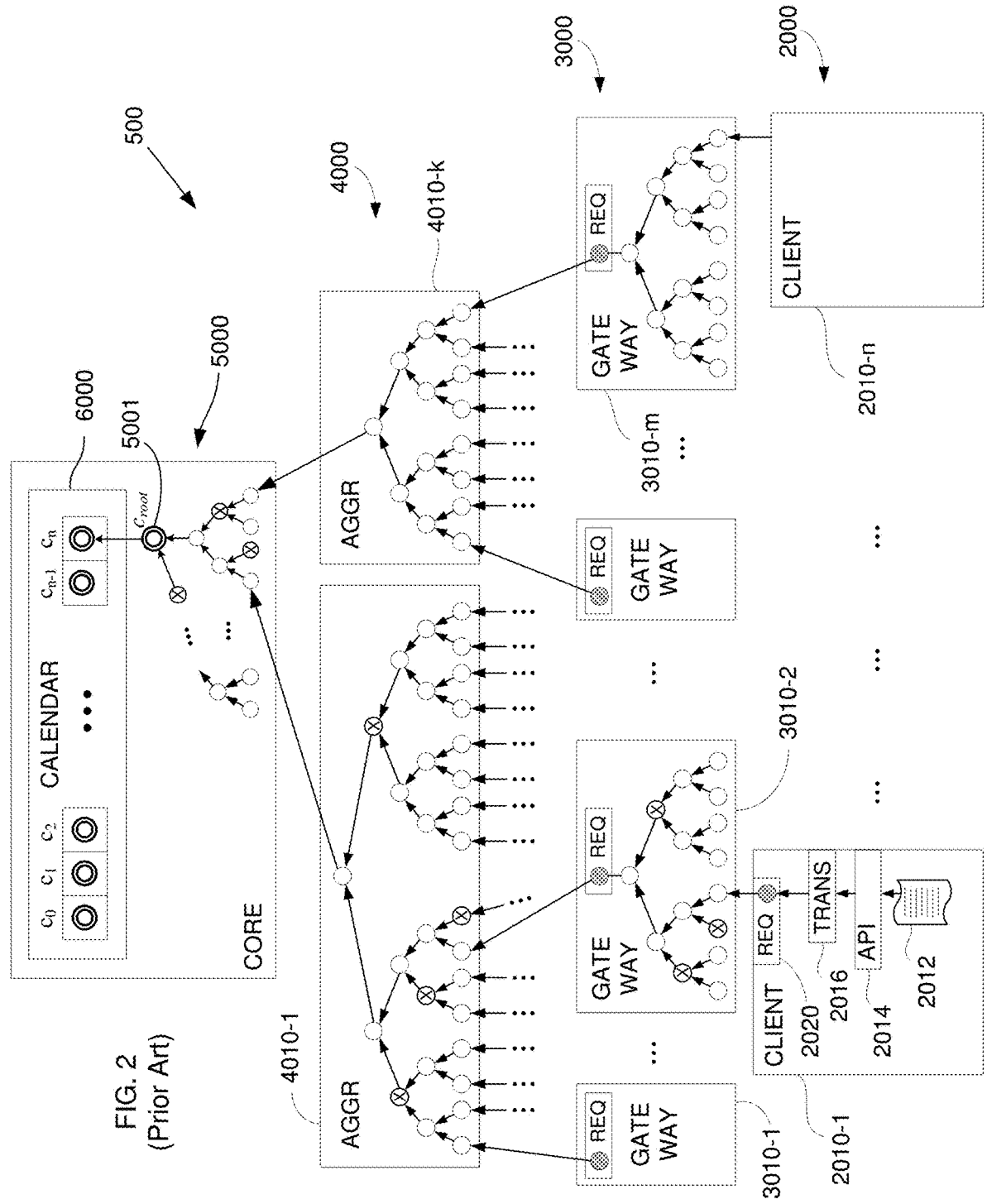
FIG. 2 illustrates an embodiment of a prior art data signature infrastructure that may be employed to advantage by embodiments of the invention.

FIG. 2 serves to illustrate how a basic implementation of GSI works. The general Guardtime infrastructure 500 has several different layers: a client or user layer 2000 comprising a number of client systems; a layer of gateways 3000; a layer including one or more aggregation systems 4000; and an uppermost layer 5000 that may comprise a "core", "administrator node", etc. Typically, the gateways, aggregators and the core will be servers, with known network connections and network communication hardware and software. The various layers implement a hash tree that iteratively hashes values, usually pairwise, until a single uppermost root value is computed, and which forms the root value for all values input during the same signature period, that is, for a single evaluation of the overall hash tree.

A client may be any system where a representation of any type of information is input, created or otherwise presented (with or without human involvement) in digital form such that it can be processed and registered using the infrastructure so as to receive a signature. In the illustrated arrangement, a client is the system where digital records are prepared and entered into the verification/signature system 500.

Although FIG. 2 shows the various layers as being separate and distinct, some implementations of the main principles of the infrastructure might consolidate or do without some of the layers or might need to add additional layers for administrative or other purposes. A gateway in the layer 3000 will typically be a computer system such as a server with which one or more of the clients communicates so as to receive requests for registration of digital records (such as documents) that its clients submit. An aggregator in the aggregation layer 4000 will similarly be a computer system such as a server intended to receive registration requests that have been consolidated by respective gateways. The distinction between aggregators and gateways will often depend on which entities control each, but this is not necessary and in some implementations there is no control or functional differences between the two types of systems.

In FIG. 2, various clients are represented as 2010-1, . . . , 2010-$n$; gateways are represented as 3010-1, 3010-2, . . . , 3010-$m$; and two aggregators are shown as 4010-1, 4010-$k$. An aggregator will typically communicate into a respective one of the lowest level hash tree nodes within the core, as described in more detail below. Only two aggregators are shown in FIG. 2 for the sake of simplicity; any number (including one) of aggregators may be included.

Each client system 2000 that wishes to use the verification infrastructure may be loaded with or communicate with an entity that includes a software package or internal system routines for convenient or even automatic communication and submission "upwards" of digital information. The software package may include some application program interface (API) 2014 that transforms submitted digital records into a proper form for processing. A digital record 2012, which may be any body of digital data, is then submitted by way of the API 2014 to a software module 2016 that transforms or otherwise uses the digital data from the record 2012, optionally with additional metadata and processing such as encryption, compression, etc., to create a request REQ 2020 that is submitted as a value to a lowermost leaf of the hash tree infrastructure. In the context of embodiments of this invention, the digital records may be any portion (or all) of a docket that is to be signed to create the corresponding signature sign.

Note that this arrangement for generating signature requests has at least two advantages. First, if a digital record, such as the data in a docket, has sensitive contents, it is not necessary to transmit them over a network and expose them to interception en route, or to reveal the contents outside of the client system itself. Second, it makes it possible to sign even large files without having to transmit such large files over the network.

The data structure of a binary hash tree is illustrated within the gateway 3010 2. The lowest level nodes of the gateway hash tree may correspond to the request REQ. As illustrated, the values represented by each pair of nodes in the data structure form inputs to a parent node, which then computes a combined output value, for example, as a hash of the two input values from its "children" nodes. Each thus combined output/hash value is then submitted "upward" as one of two inputs to a "grandparent" node, which in turn computes a combined output/hash value for these two inputs, and so on, until a single combined output/hash value is computed for the top node in the gateway.

Aggregators such as the system 4010-1 similarly include computation modules that compute combined output values for each node of a hash tree data structure. As in the gateways, the value computed for each node in the aggregator's data structure uses its two "children" nodes as inputs. Each aggregator will therefore ultimately compute an uppermost combined output value as the result of application of a hash function that includes information derived from the digital input record(s) of every client that submitted a request to a gateway in the data structure under that aggregator.

In many cases, the core 5000 is maintained and controlled by an overall system administrator. One advantage of this is that input requests will receive signatures that encode information from other, unrelated digital records as well, from completely independent sources, which then will make it in practice impossible to create fake signatures. This is not required by any implementation of GSI, however.

Within the core, a hash tree data structure may be used compute a single root value $c_{root}$, using the root hash values of the aggregators as lowest level inputs. In effect, the hash computations and structure within the core form an aggregation of aggregation values. The core will therefore ultimately compute a single current uppermost core hash value $c_{root}$ at the respective tree node 5001 at each of a sequence of calendar time intervals t0, t1, . . . , tn. This uppermost value is referred to here alternatively as the "calendar value" or "current calendar value" for the time interval (signature period) ti. If calendar values are computed according to precisely determined time values, such as one calendar value each 1.0 s, then each calendar value will also be a precise representation of time. In short, each digital signature issued in a given calendar interval will intrinsically and provably be tied to a particular calendar value. Due to the essentially non-invertible nature of cryptographic hash functions, this time association will be as essentially impossible to fake as the data that led to the corresponding signature itself. The calendar value for each signature period may be stored in a data structure referred to here as a "calendar" 6000 along with previous calendar values.

Note that the uppermost tree node 5001 represents the root node of the entire tree structure of nodes junior to it. This will change upon recomputation of a new uppermost core hash value at the end of the next period of accumulating requests and generating signature vectors (also referred to as "data signatures") containing recomputation parameters.

The simplest GSI signature includes a vector of values that enable an entity to recompute the calendar value corresponding to a purportedly correct input. For example, in FIG. 2, a signature vector for the input 2012 could include the values marked "X" in the hash tree path from the request REQ 2020, up through hash tree in the gateway 3010-2 and aggregator 4010-1 up to $c_{root}$ and to the corresponding calendar value $c_n$. The signature should then also include the order in which these values are to be hashed, as well as (depending on the hash function) whether they are hashed to the "left" or "right".

Assume now that an entity wishes to test whether a purported unaltered version of a particular digital input record is to be tested. The operations used to generate the original REQ may then be applied to that version, thereby forming an "initial leaf value" that can then be iteratively hashed (in the given correct order) with the values in the signature vector up to the level of the calendar value included in the signature, or, if extended, further to a composite or blockchain value (see below). If the uppermost computed values don't match, then the entity will know that the purportedly unaltered version in fact is not identical to the original.

One advantage of GSI is that, except for possible and optional temporary establishment of user or client ID during a session, and optionally temporarily until a time of "publication" (described below), it does not rely on public/private keys. This thus avoids the need to store and maintain keys, which may expire, and whose certificate authority represents a required third-party trust authority. Another advantage of the signatures generated using GSI is that they automatically and securely encode time to the precision of a calendar period.

In one extension of GSI, any of the client systems, gateways, and/or aggregators may generate and include identity values as separate "leaves" in the hash tree 500, such that these identity values become encoded (as additional vector elements) within all signatures whose initial computation paths pass through the respective systems. This feature is described in U.S. Pat. Nos. 9,853,819 and 9,853,819, and may be included in the signature scheme used in embodiments of this invention. If so, then the signatures in each docket will also encode information about all or at least some of the systems that participated in the signature generation. One rule might then be that a certain gateway and/or aggregator mus (or must not) have been involved in signature generation.

Still another advantage of signatures generated using GSI illustrated in simple form in FIG. 2 is that, depending on the chosen implementation, it is not necessary to submit anything back to the infrastructure itself in order to verify data given its signature; rather, assuming the hash function(s) used in the infrastructure are known, the verifying calculations can be done by any entity independently.

In some implementations of GSI, the calendar values generated over some period (including from the beginning of system time) may be combined using a Merkle tree to produce a composite value that may be "published" in some unalterable medium or form, such as a physical or electronic medium or data structure, in print (such as a newspaper, many copies of which are widely distributed), in a widely distributed or witnessed database or web-based entry, etc. Here, "unalterable" means that it cannot be changed without detection, that is, that the mathematical or physical difficulty of tampering with data without being detected is so great that no reasonable person would doubt the result of the verification/detection scheme.

Another example of an unalterable data structure that calendar values may be stored is known as a "blockchain", which may be used to implement the calendar itself. Although the term "blockchain" itself, as well as related terms, do not yet have universally accepted definitions, typically a "blockchain" is understood as being a data structure comprising a series of usually (but not necessarily) time-stamped blocks, where each block includes data corresponding to one or more transactions, hashed together with linking data, such as a hash of all or come portion of the contents of the immediately preceding block. The chain can then be used to create a ledger, which is typically an append-only database. Once data is entered into a block of the chain, the entry is essentially irrefutable, since any tampering with the data would be reflected in the chained hash calculations and is thus easily detected.

Note that the calendar 6000 itself is a form of blockchain in that it comprises a series of values. One way to accomplish this is to store each calendar value together with appropriate metadata, thereby forming a kind "block", including at least some value derived from the previous calendar value block. Even in the implementation of GSI in which a Merkle tree is used to create a composite value, the different calendar values are linked in the sense that any alteration of a past value will also be Data Attribution System Some embodiments thus relate to a novel data attribution system and method of operation. Data may be included in data structures ("containers" or "dockets"), which may be nested, and which contain information enabling a system (automated or under user control) to track the provenance of the data. In one embodiment, this may be done without a need to query an external database of provenance information, but rather only the signature-verifying entity.

The data attribution system described here leverages GSI to enable data accountability, authenticity and relevance throughout cyber environments and architectures. Because of specific inherent aspects of GSI, data assets receive immutable data authenticity, signing entity, and absolute signing time verification. These components are used here to create an attributed environment that enables distributed data sharing, data validation, and access control models to better align with modern architectures such as Cloud, Software Defined Networks, IoT and Connected Vehicles, to name a few.

One structure of data containers that may be used in embodiments is described in greater detail below (and also discussed above with reference to FIG. 1), but to facilitate understanding of the data attribution system, containers are also summarized here. Because GSI signatures can be created for each individual data asset, they can also secure the containers/dockets. Containers as disclosed here enable a normalized construct for data to be bundled with metadata and other attribution mechanisms such as attributes (for example, rules), contextual based information, or any input to help make a granular and accurate decision about the individual data object. These containers may provide immutable, distributable, and independently verifiable inputs enabling key enterprise capabilities such as, but not limited to, access control enforcement, secure data transfer, data lineage history, etc. By combining these constructs with simple logic such as nesting, the containers/dockets can provide a cryptographically sound history of any data asset, which is then completely cryptographically verifiable.

FIG. 1 illustrates, abstractly, several of the many options for different distributed data migration and transmission use cases. For example, a customer may wish to provide complete data validation and history to downstream systems across many technology stacks, networks, and IdAM Authority Enclaves. In some such cases, the goal may be to ensure that the initial data set data0 remains verifiably unchanged as it moves downstream, with no "splitting" (decomposition), additions or deletions, in which case no downstream entities may need to add any data of their own, although their identities may be included in their respective dockets' metadata and encoded in the respective signatures.

Because of the nature of the containers described above, when used with GSI as the signature mechanism (and thus a "GSI Container" or "GSI docket"), they can be sent and distributed to any entity needed to verify the data. Because they are cryptographically sound, there is no threat of a change to the container. This aspect, coupled with the fact that they are independently verifiable, means that an entity can verify the data without communication with the data creator, and also that data assets can be verified across boundaries and authority.

Example Attribution Language (XDAL)

Because GSI containers may be highly distributable and interoperable, to fully leverage the value, it is preferable, although not necessary, to have a common lexicon or "language", that is, set of access and management instructions, to help improve the interoperability and granular data validation capability. To perform trusted transactions in a highly distributed environment without requiring explicit knowledge of entities, the inventors therefore created a common "language" that can be used to define various rules. For the sake of succinctness, this language is referred to herein as GSI XDAL, or simply "XDAL". With this language, cross-use case value can be provided without the need to create use case-specific data integrity models. The same platform may also be reused from a secure software development lifecycle platform, to a distributed connected car validation platform, or an access control mechanism. Nonetheless, XDAL represents just one example, used in a prototype, of a set of instructions and format that may be used to specify rules for processing of data assets.

XDAL may provide one example for distributed and secure communication and storage of digital assets, although users may extend it to include representations for their own specific use case, or create their own rule set and syntax.

Because of the properties of GSI and GSI XDAL, XDAL can be leveraged with or without the use of the GSI Containers. In a similar fashion, the GSI XDAL can be appended and combined as data events progress. Instead of having a more "file"-like structure, XDAL can be leveraged as a XML-based history of the data asset, with simple logic such as appending elements as events instead of nesting GSI Containers as highlighted in the previous section and illustrated in FIG. 1. This allows for more traditional XML technologies, such as XPATH or XQuery to easily read and validate the GSI Data Attribution Component.

Example—Secure Application Development Platform Basic Operations

In one prototype, basic operations, or "patterns" were created to build additional layers of security throughout access system. While validation of the GSI components is cryptographically sound and verifiable, these operations allow for a second layer of security, or "Defense in Depth" approach to the actual data, by setting a standardized data operation language. With each operation, specific behaviors of the data asset may be assumed. If a data creator or signer signs an operation into the language, the receiving node will have context for which to make a more granular decision about accuracy and relevancy of the data.

The operations illustrated here are Data Transfer (such as from E0 to E1 in FIG. 1), Data Decomposition (such as D1 being decomposed into D1a and D1b in FIG. 1), Data Combination (such as Dx and Dz being combined to form Dy) and Data Addition (for example, if data2 in D2 is not null).

Data Transfer

In a Data Transfer operation, the data does not change as it moves throughout a system or between systems (entities). A Data Transfer provides each successive entity with the information to validate that the data should follow this operation and can be included into the policy enforcement (rules) and verification (via signature) of data throughout the lifecycle. A GSI Container is created at each subsequent node/entity, inherently building a cryptographic history of where the data has been, what entities have moved it, and when the different events happened. Because the operation uses the GSI Containers, each subsequent transfer of the data can be individually validated.

Example Use Case

Logging Data flows from an application in a cloud infrastructure and through various cloud components to be stored and monitored in a Security Operations Center for Continuous Monitoring Cyber Fight Example Based on Data Transfer operation embedded in a container, actual log (such as a system log syslog) data should not change. Compromise detection can be achieved by validating both the GSI Signatures and the operation of data transfer.

Data Decomposition

In a Data Decomposition operation, a larger data asset is been split into smaller assets or subsets of the overall initial or previous asset. Because the subsets of the overall data assets should all be the same upon decomposition, the subsets can be traced back to the initial larger data asset. With this operation, data divergence resolution and point of truth issues can be quickly verified and remediated. In Data Decomposition, GSI Containers may be created at original data assets and at each subset creation. All assets may be signed and can create individual data lineage trees.

Example Use Case

A system stores large data sets of global map data. Analysts need to be able to use only the area of responsibility for their job role, for example the North America and South America sub-sets. The decomposition of data can provide traceability back to the original data used. If confliction arises they can trace back to original data asset.

Cyber Fight Example

Data from one analyst may have been unknowingly compromised and conflicts with other analyst data. upon detecting data conflict, operations may be halted and verified against the original global map data. Because data is cryptographically linked, via the signatures, the correct version of data can be retraced Data Combination Data Combination provides accountability for an asset that is comprised of already signed assets. In this operation, the combining entities, for example Dx and Dz have been signed with GSI (signx and signz) and possibly have operations (rulesx, rulesz) associated with them already. For example, Dx could have been transferred across specific nodes in order to get to integration developers who are leveraging that module or library. With this, the application distribution point or even a mobile device can validate the application and associated modules.

Example Use Case

An organization creates mobile applications. These applications are created by leveraging approved modules such as cryptography, data exchange, and enrollment modules. These modules are added together to create secure mobile applications.

Cyber Fight Example

A mobile app is distributed within a GSI container to a mobile device. Before install and run, the mobile device (an entity) verifies the contents of container to verify the application is sound and the modules within the application are correct. If either fails, the mobile device may quarantine the application and alert a mobile device management system or authority, and may also have the alerts, quarantined applications, etc., signed for later forensic research.

Data Addition

Data Addition provides a operation in which, unlike in Data Combination, the data added to a new asset (that is, new data added by an entity) may be both GSI signed and unsigned assets or updates. The purpose of splitting this out is that pieces of the added asset will have a cryptographic data history, while some, such as additional comments or processing, cannot be signed. This provides the ability to dynamically update data without losing complete cryptographic provenance and history.

Example Use Case

An organization overlays map data to image sources. This map data is added by a human and is not signed at time of addition. The result of this update needs to be validated after additions are created.

Cyber Fight Example

Map data from unsigned source is maliciously or accidentally added after image and map data intended for viewing has been signed. Because the intended image and map data asset is signed, an entity can verify the additional data added correctly is valid, but any additional data added is invalid. The system may then quarantine the data and alert security personnel. Data going further would be remediated due to immutable architecture via GSI and rolled back to known good state.

By combining GSI signatures, Containers and the XDAL operations, customers can thus leverage GSI to provide distributed, independently verifiable and cross-boundary data verification. This combination of technologies can provide a unique history and snapshot of where data has been and what it is comprised of at any given time. This is provided in a single, cryptographically sound container that may be distributed, verified, and reconstructed in real time. See FIG. 4, which is a simplified example of a user interface that may take advantage of this.

Figure 4:
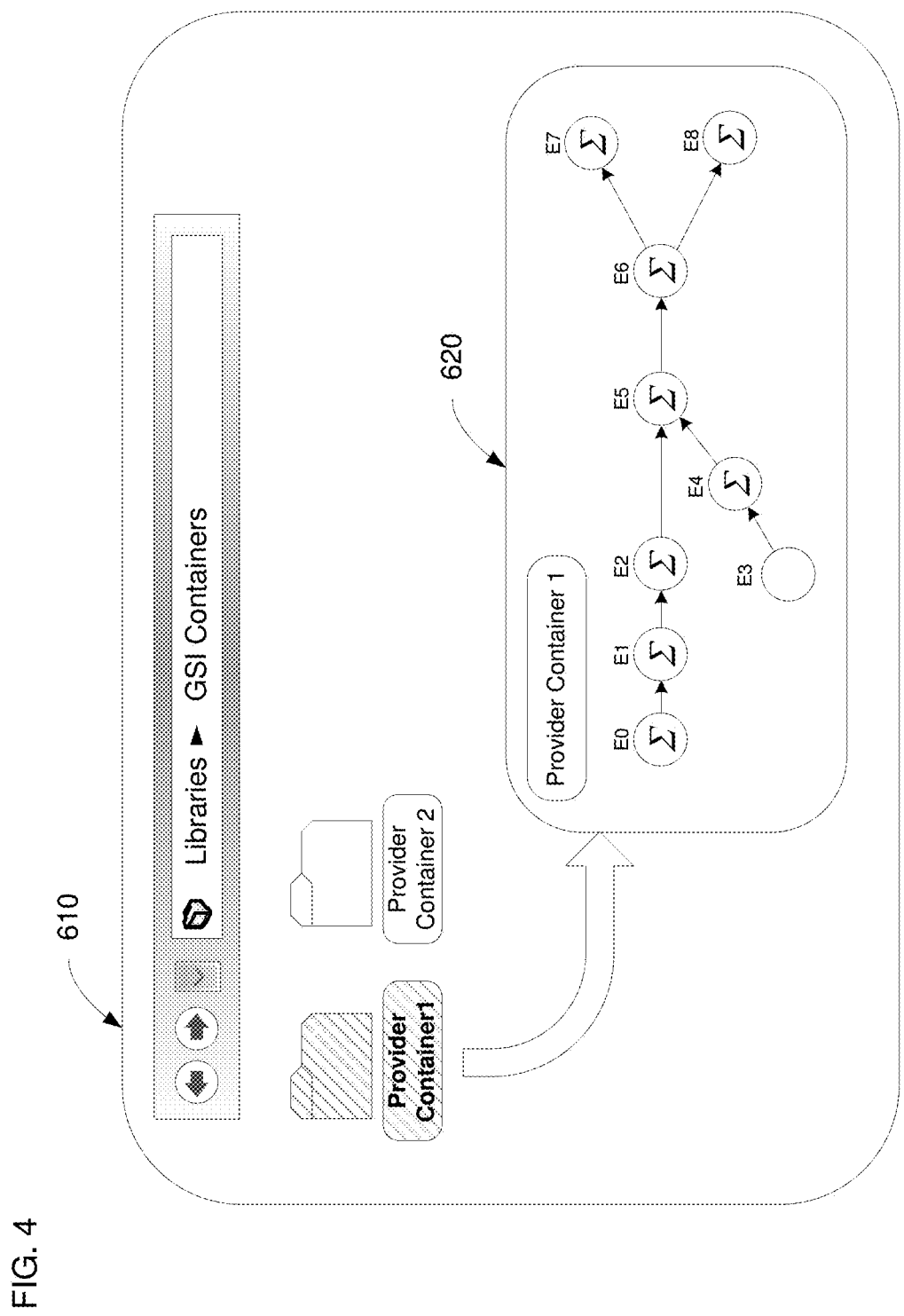
FIG. 4 illustrates a basic user interface that enables a user to conveniently examine and verify data provenance.

In FIG. 4, a user is viewing a file selection window 610 on his computer. In this illustration, two different data assets, ProviderContainer1 and ProviderContainer2 are stored under a GSI Containers library. As indicated by shading, the user has selected ProviderContainer1. Either on the same screen, or on a different screen, the docket control software module 310, or some other docket extraction and analysis software module, in the user's computer may then open the corresponding file and, based on the provenance information encoded in the various dockets, generate a lineage map 610 (similar to FIG. 1) of the data asset. In the FIG. 4 illustration, this asset (docket) was created by a creator entity E0, which then transferred it to E1, which transferred it to E2, which transferred it to E5, which also received a docket from E4, which received it from E3, and after merging the E2/E4 dockets, E5 transferred the merged docket to E6, which then either split it or transferred separate copies to E7 and E8.

Before generating the lineage map, the user system may also extract the signatures contained in each docket and verify them, for example, by using the recomputation-to-calendar-value procedure in GSI. In FIG. 4, entities whose dockets' signatures have recomputed correctly (or otherwise shown that the contained data is valid), have been marked with a "Σ". At a glance, the user may therefore see that the docket originating with E3 was either not signed at all, or now has contents that do not correspond to the included signature. Depending on the implementation, this may be cause to take some remedial or protective measure, such as marking as suspicious all dockets that have the "unverified" docket in its lineage, to query E3 further, etc.

In one embodiment prototype, when a user clicks on any of the displayed entities, a textual display is opened that shows each action taken (including the entity that took it)

from creation to the selected entity's docket, along with signature information, which rules are in force, and exceptions, etc. Generating and displaying the lineage map for a given asset (such as the initial data data0) thus provides the user with a convenient and easy-to-interpret representation of the chain of provenance of the asset.

The lineage map shown to a user could be either partial or complete. For example, assume that the entities are entities in a supply chain and the dockets include information about the work completed at each step of the supply chain. A user at a particular point in the supply chain might either be interested in or permitted to see the portion of the supply chain lineage map up to his production point. A system administrator or supervisor or other central authority, however, might be permitted to view and analyze the entire lineage map from beginning to end, including all branches, loops, etc.

Identity and Access Management System

Because, currently, identity and access management data is not cryptographically sound, this embodiment leverages a data structure referred to here as GSI Identity Containers (GICs) to provide immutable evidence and history of identity data. Using GSI and GSI Containers, cryptographic evidence and a data lineage of all events is associated with identity data. An individual container is thereby provided for each user or container in a single cryptographically immutable asset, which can then be distributed and verified independently via, for example, a Security Operations Center or other third-party monitoring service. This embodiment may be expanded to support a larger secure enterprise strategy. The evolution has been broken down below to illustrate how an organization can adopt the usage of GICs in a phased approach.

Phase 1—Identity Protection and Compromise Detection

It is advantageous to provide cryptographically immutable evidence of all Identity events. Events such as permission escalation, group management, attribute (rule) changes, or addition or deletion may all be cryptographically bound to individual GICs. These GICs may thereby provide independent identity histories that can be leveraged to build alerts, patterns, and remediation techniques. Unlike other cryptographic mechanisms, the GICs may be made append-only, preferably backed by a widely witnessed event, or the Guardtime GSI calendar/blockchain. Because of the nature of the GSI system, the identity data and GICs cannot be compromised—once an event takes place, there is no avenue to remove that event, providing a point of truth for identity within an identity provider.

Figure 5:
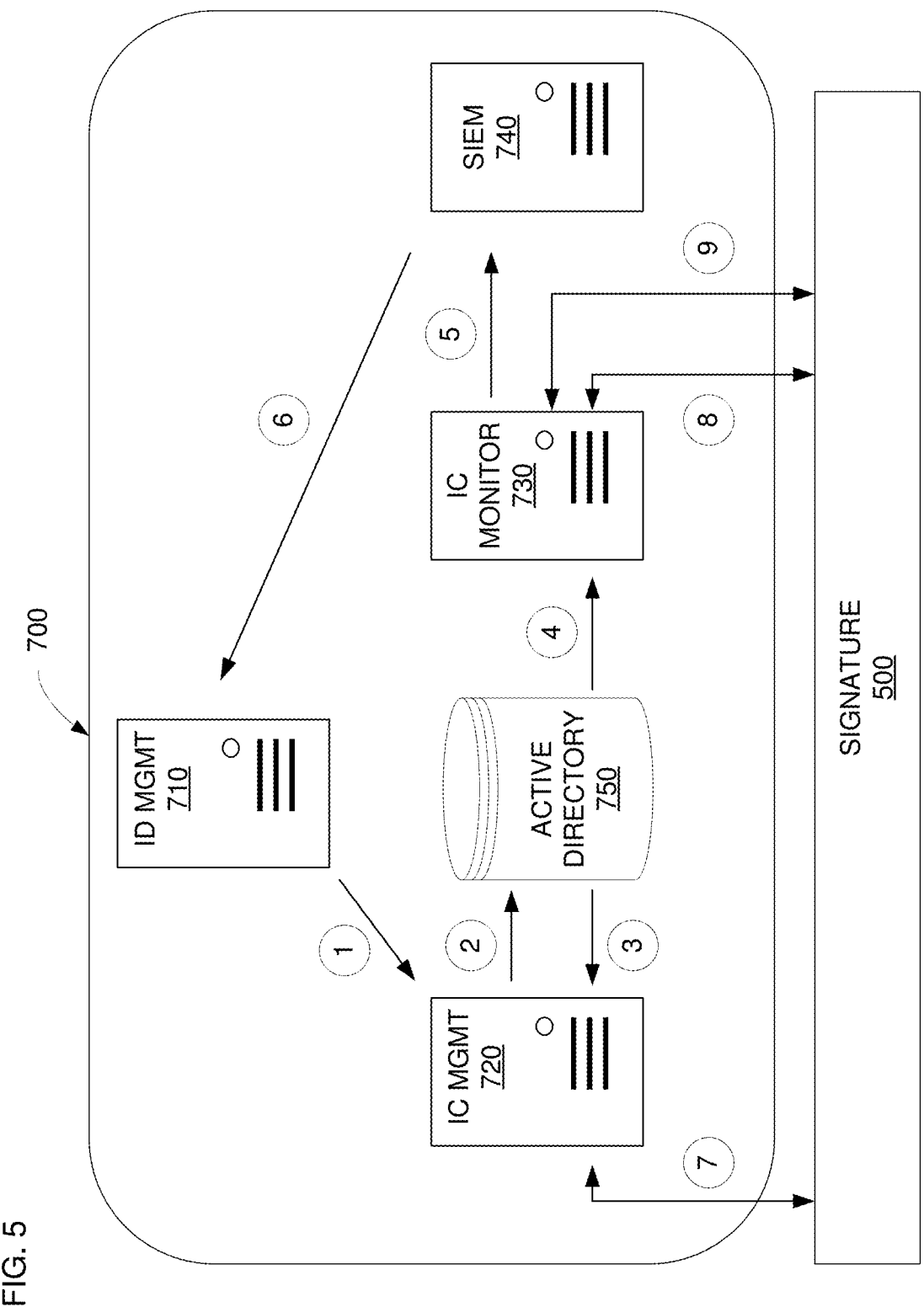
FIG. 5 shows main components of one embodiment of an identity and access management system.

FIG. 5 illustrates an embodiment that provides, within an enterprise 700, a non-intrusive and easily deployable capability to create GICs for identity events, leveraging the known Active Directory 730 (provided by Microsoft, Inc.). This solution also provides a GIC Monitoring Service 730 that monitors changes and additions to GICs. This embodiment may also optionally provide a distributed GIC store in which a GIC Management Service 710 and the GIC Monitoring Service 730 can be leveraged as a third-party data store. Because the data in the GICs are only hashes, no identity data will have to be shared.

The embodiment shown in FIG. 5 has five main components. The components "IC MGMT Services" 720 and "IC Monitoring Services" 730 are represented as stand-alone components; this is optional and they can also be embedded in other components, such as an "Enterprise SIEM Services" component 740, respectively. (SIEM is a known abbreviation for Security Information and Event Management.) This embodiment has abstracted the two services for clarity and ease of deployment.

Active Directory (AD) 750—In this embodiment, the current enterprise identity provider is assumed by way of example to be Active Directory. This can be any identity provider.

ID Management Services 710—This may be an existing enterprise service. This service, in whatever form, creates and manages users and accounts within Active Directory. This can be Active Directory or an abstracted platform managing Active Directory.

Enterprise SIEM Services 740—This is assumed to be an already existing enterprise service. This is a monitoring and event correlation service.

IC MGMT Services 720—This component accepts identity data from the ID Management Services module 710 and creates or updates the GICs. This component can be embedded in the current enterprise ID Management Services 710 or abstracted as its own service. This service can add new users and associated GICs, perform bulk creation of already existing users, and management of all events of current users with associated GICs.

GIC Monitoring Services 730—This service is responsible for monitoring any changes to Active Directory (AD) users and the associated GICs. The service will pull the normalized identity information from AD, and compare that with the embedded GIC within each user account. The IC Monitoring service has an option to also store current GICs in a distributed GIC Store for an added layer of verification. Because the data will not be stored in the GIC, the IC Monitoring service 730 may verify the data locally without moving data outside of the enterprise boundary. This service can be a stand-alone service as depicted for ease of deployment and integration, or embedded in the Enterprise SIEM Services 740.

The data flows illustrated (in numbered circles) in FIG. 5 are:
 1: Identity data is distributed
 2: IC is stored
 3: ID data is retrieved
 4: ID data is retrieved {Identity Data, GIC}
 5: An Alert is issued
 6: An Alert is issued, including identity data
 7: ID data is signed
 8: Alert event is signed
 9: GIC data is verified Phase 2—Identity Event and Operation Correlation This embodiment relates to a platform that can leverage the Guardtime GICs to correlate access and usage events. This embodiment integrates current access control and authorization components with data attribution agents to provide GSI-aware capabilities. This capability will provide these assets to correlate access and usage requests to resources with identities, creating a broad, real-time view of individual user's access. Event information and history may be made cryptographically immutable using the GSI GIC and data attribution containers/dockets, providing immutable data provenance that can be validated independently and distributed across operational boundaries.

Figure 6:
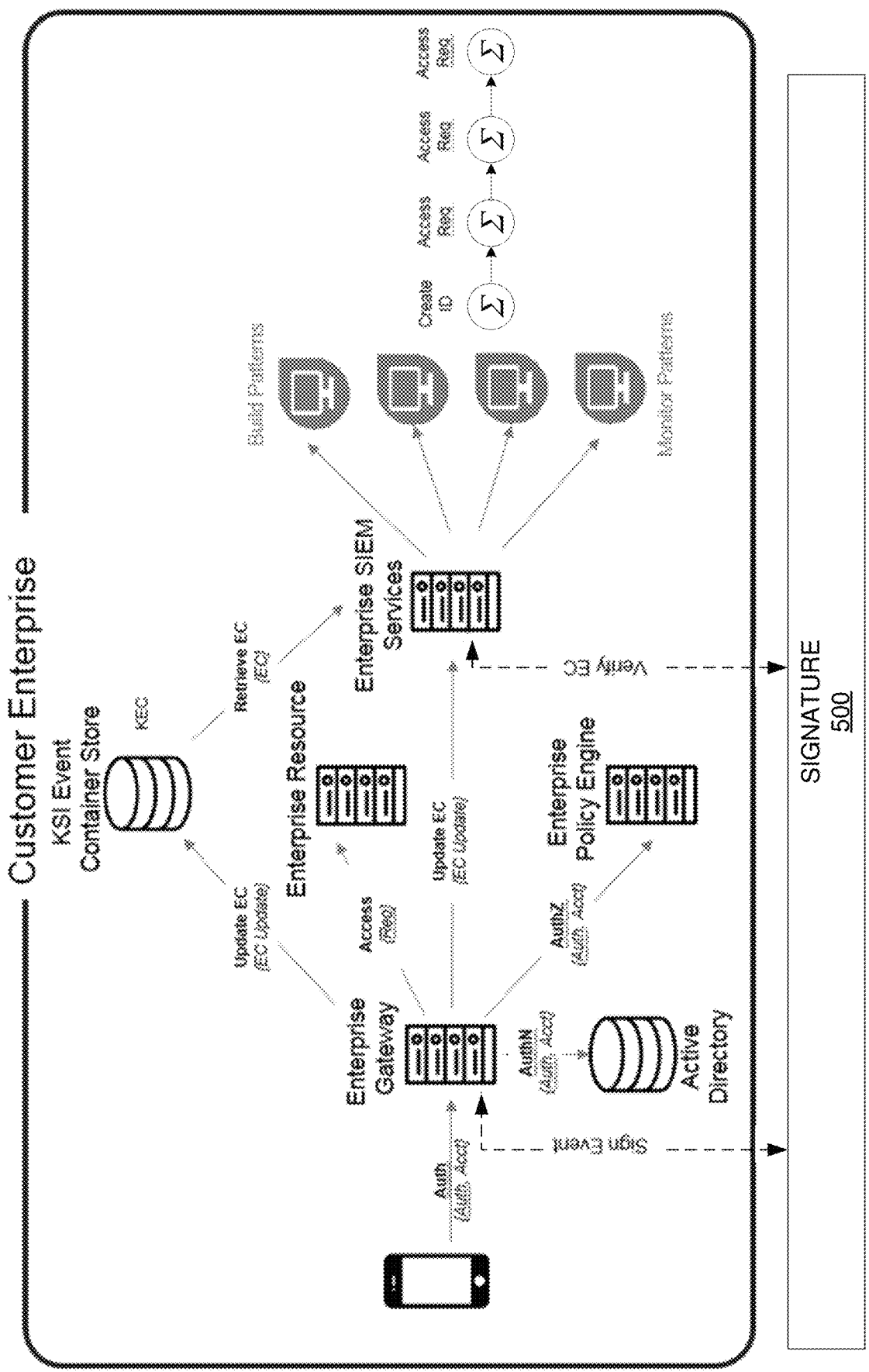
FIG. 6 shows main components of one embodiment of an Identity Event and Operation Correlation platform.

This embodiment, illustrated in FIG. 6, provides a non-intrusive and easily deployable capability to create GICs for identity events, identified in Event Containers (ECs), leveraging Active Directory. The solution may also provide a GIC Monitoring Service that will monitor changes and additions to GICs. This embodiment may also optionally provide a distributed GIC store in which the GIC Management Service and GIC Monitoring Service can be leveraged as a third-party data store. Because the data in the GICs are only hashes, no identity data will be shared.

Forward Secure Containers

Although novel in their own right, embodiments may use what is referred to herein as forward secure evidence containers (FSEC), wherein a digital asset is combined with an identity token and signed with KSI® to create an immutable container. The identity token may be an IAM (Identity and Access Management) system, a PKI Certificate, or other. GSI signatures will be created for the digital asset and the identity token. These elements are then packaged into an evidence container, which is also signed by GSI.

PKI and GSI

PKI (Public Key Infrastructure) provides a means to create a chain of trust for verification of identities on a network. Various PKI signature schemes like RSA (Rivest, Shamir, Adleman), DSA (Digital Signature Algorithm) and other elliptic curve-based signatures may be used to establish a connection between the private key and the signed data. PKI certificates are used to bind the identity of their subject to a public key.

PKI-based digital signatures are commonly used not only to ensure that the signed content was signed by the person purported to sign the document, but also to ensure that the entity cannot later deny that they furnished the signature. Although a certificate is expected to be used for its entire validity period, sometimes the private key becomes compromised, and the certificate must be revoked. While certificate validity is easy to establish at the time of verification, it must be established at the time of data signing, so that revocation does not provide an opportunity to repudiate earlier signatures.

In order to maintain a reliable digital identity, users need to correctly obtain and secure their keys. The process follows this model:
  User creates a certificate request which has the correct user ID
  RA (Registration Authority) verifies the user's identity
  The CA (Certificate Authority) extends a trust relationship to the User
  Users secure their private key In cases when the last step fails, the CA may revoke the certificate, withdrawing the trust relationship. Therefore, certificates may become invalid before their planned expiry, and the CA must notify other users that the certificate is no longer trusted. Typically, certificate validity information is distributed by the CA via either a CRL (Certificate Revocation List), which is a signed blacklist of revoked certificates or by OCSP (Online Certificate Status Protocol) as specified by RFC 2560. OCSP responses are signed statements from the trusted service provider (Often the CA itself) about the validity of a specific certificate at a given moment.

Although CRLs are the conventional method for certificate validity checking, they do not scale well and are used primarily for archiving/historical verification and in off-line mode. Because CRLs are long, they incur a high storage overhead, and require the user to search through the whole revocation list to determine the validity of the certificate in question. CRLs are updated periodically—potentially leaving an attack surface open till the next CRL update—i.e. a certificate may verify correctly after it has been revoked.

There are two variants of CRL:
  Base/Full CRLs contain a complete list of certificates that have been revoked and are published automatically in specified intervals determined by the administrator of the CA.
  Delta CRLs are shorter, but only contain a list of the certificates that have been revoked since the base/full CRL was published.

In contrast, OCSP allows a client to query the OCSP responder for the current status of a certificate. In theory, this saves time searching through a large CRL and also saves CRL download bandwidth. In practice, however, OCSP responders are usually updated on the same schedule as CRLs and, thus do not provide more up-to-date information. Additionally, the process of checking CRLs and OCSP responders is onerous, complex and is rarely implemented correctly. In practice, the vast majority of modern browsers do not correctly implement the process in all scenarios.

While OCSP responses contain timestamps, their clocks provide no accuracy guarantees, and, in any case, the accuracy cannot be later verified. GSI signatures are complementary because they provide a cryptographic time stamping component that can be used to anchor the timing of the OCSP response to the GSI blockchain. GSI signatures also embed the identity of the endpoint that issued the signature.

Figure 7:
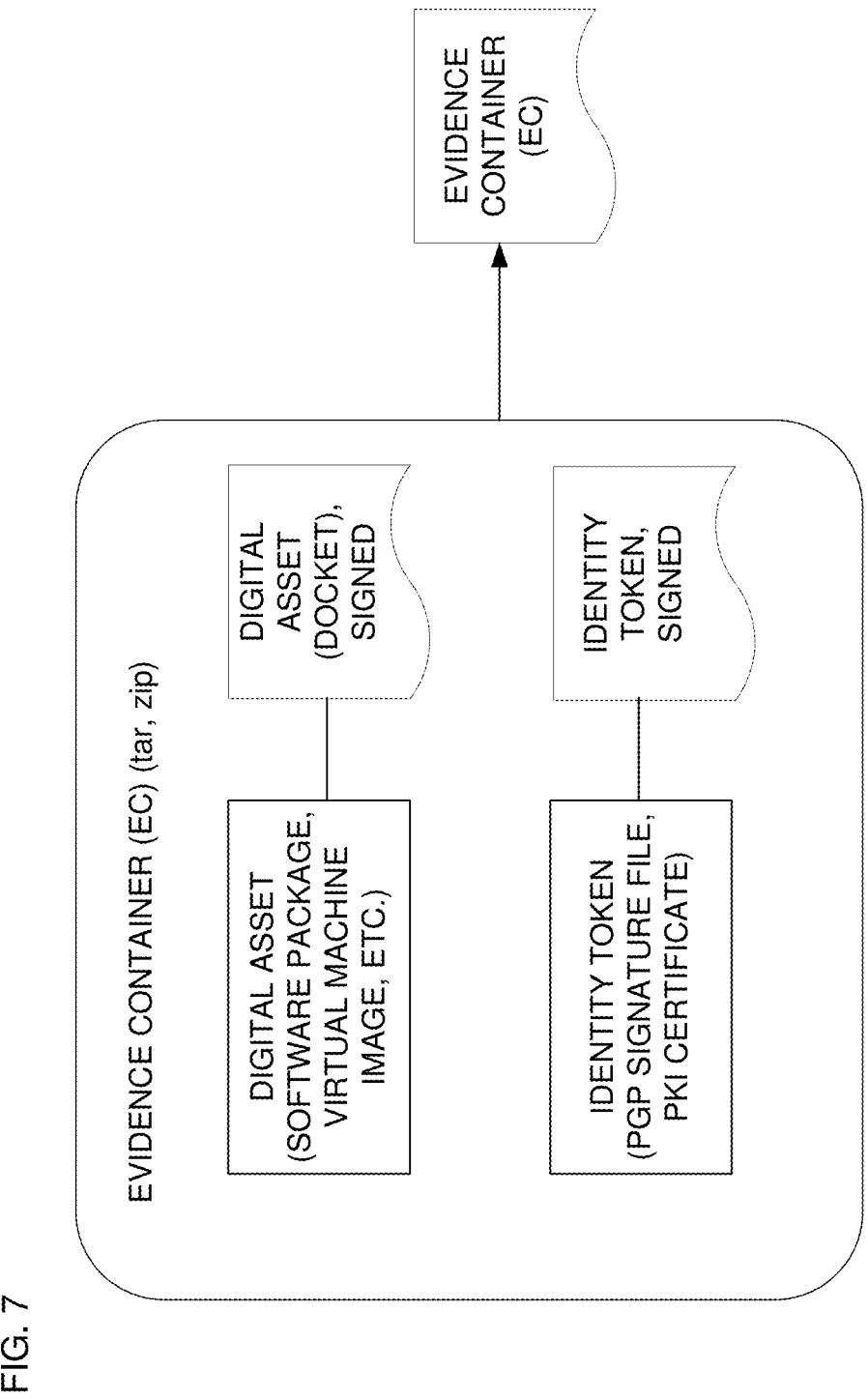
FIG. 7 illustrates the construction, signature and verification of containers.

FIG. 7 illustrates the Construction, Signature and Verification of containers, as follows:
  Constructing
    Step 1—GSI sign the identity token
    Step 2—GSI sign the digital asset
    Step 3—Create the evidence container—consists of the digital asset and corresponding GSI Signature, along with the identity token and corresponding GSI signature
    Step 4—GSI sign the evidence container
  Signing
    At the time the identity token is created, a GSI signature is also created marking the time and securing the content of the identity token. Because both the identity token and the GSI signature must be available for later verification and stored in a secure location, they are included in the evidence container (EC) along with the digital asset and its GSI signature. This inclusion ties the signature of the identity token to the signature of the digital asset and allows the digital asset and signature to be verified independently of the container.
  Verification
    The evidence package may be presented for verification with the corresponding GSI signature. If the verification passes, the integrity of the digital asset, identity token and the link between the two are proven in one step. This provides assurance of the authorship of the digital asset and the content of that asset. Both sender and the receiver of the package must have access to GSI services, the GSI signatures and the digital asset and identity token.

In addition to certificate revocation, PKI-enabled devices must be rekeyed after being compromised. Often, assets must be re-signed afterwards; otherwise, critical documents that were signed by the now compromised key could be called into question. The approach using GSI eliminates that requirement, since it is then possible to establish that the signatures were created prior to revocation.

GSI as a complement to PKI

Figure 8:
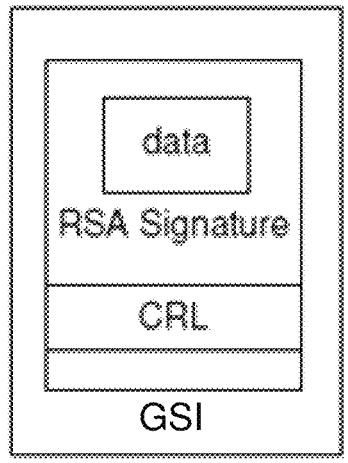
FIGS. 8 and 9 illustrate encapsulating Certificate Revocation Lists (CRLs) and Online Certificate Status Protocol (OCSP) responses, respectively.

See FIG. 8, which illustrates encapsulating CRLs. Because of the difficulties in checking revocation status, revocation of a key also provides an opportunity for the key's owner to repudiate old signatures. This opportunity exists when the key is no longer valid yet other users cannot reliably establish the time of signature. To combat this, the person relying on the signature needs a means to prove that the certificate was valid at the time of signing. This requires:

The signature for the content

The certificate

The CRL or OCSP response that indicates the certificate was valid at the time of signing A reliable timestamp to prove accuracy of time of signing and CRL or OCSP validity GSI provides the reliable trusted signing time. This helps verify that the signing certificate was valid at the time of signing by incorporating the signing time into the GSI signature data. Signing time can be strongly proven and verification is possible even after certificate has been revoked. Additionally, a GSI signer's ID can be tied to user's organizational affiliation.

Figure 9:
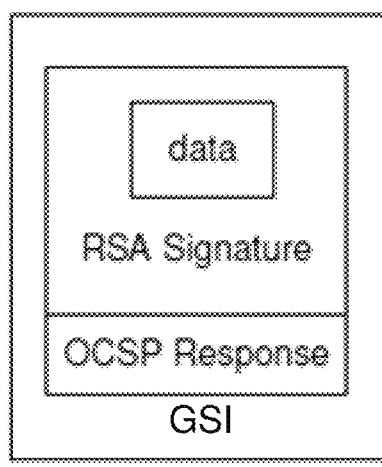

See FIG. 9, which illustrates encapsulating an OCSP response. Here, GSI Signature=gsi (rsasig(data)/OCSP response), where "gsi" indicates the operation of obtaining a Guardtime signature for the parameters in the given order.

OCSPs are smaller than CRLs and provide real-time information about certificate validity. Optionally, additional data can be included in the OCSP request as a nonce.

There are server/client components to OCSP: The server component is called an OCSP Responder. The OCSP Responder accepts status requests from OCSP Clients. When the OCSP Responder receives the request from the client, it determines the status of the certificate using the serial number presented by the client. First the OCSP Responder determines if it has any cached responses for the same request. If it does, it can then send the same response to the client. If there is no cached response, the OCSP Responder then checks to see if it has the latest CRL information, issued by the CA in its local cache. If it doesn't, then the OCSP Responder must retrieve the CRL from the CDP (CRL Distribution Point) locations listed in the certificate. In the latter two cases, the OCSP Responder must parse the CRL to determine the revocation status, and send the appropriate response to the client. The OCSP Signing Certificate signs the response.

OCSP supplements CRL validation and enables high-performance validation of certificate status. OCSP requests are sent over http to the OCSP responder. A client can query the status of a single certificate rather than having to download an entire list. OCSP puts less overhead on client and the network.

AS Sertifitseerimiskeskus is a nationally accredited CA in Estonia that has published the specification "BDOC—Format for Digital Signatures" (http://www.id.ee/public/bdoc-spec212-eng.pdf), in which OCSP is used for time marking. As soon as the PKI signature is created, certificate validity information is obtained using an OCSP responder. The hash value of the signature along with the hash algorithm identifier is presented as the nonce of the OCSP request. The OCSP responder returns this nonce value along with the response, which proves that the signature in question was created prior to the OCSP response.

GSI signatures provide an immutable, and elegant alternative to BDOC, which achieves the same ends. By including the OCSP response in the GSI-stamped secure container and comparing the GSI timestamp to the timestamp in the OCSP response on certificate revocation, one can validate that even if the certificate was revoked and the private key is no longer deemed trustworthy, the PKI signature and the associated data were valid at the time of the GSI signature. Signature=(gsi (rsa(data)/OCSP response)/rsasig(data)/OCSP response)

The GSI system uses a hash-tree based mechanism for integrity protection. If the private key used to sign an OCSP response is compromised, the response becomes unreliable and therefore the validity of the associated signature becomes questionable.

In the case of significant advances in technology that threaten the security of PKI cryptographic constructs, using GSI to seal all the evidence (signatures, certificates, CRLs, OCSP responses) can also be used to prove that the evidence was intact before the construct was deemed questionable thus improving and extending the reliability of PKI signatures.

PKI signatures could also use a PKI based TSS (trusted time stamping service) to prevent back-dating. Unfortunately, this merely introduces another PKI signature, which must be trusted in order to validate the data. Additionally, the certificate of the TSS also expires, introducing more overhead since the user must re-assemble and present the evidence periodically over the life of the data.

In contrast, GSI signatures are immune to backdating, do not expire, and do not rely on the secrecy of keys. With a carefully constructed evidence container, GSI can provide non-repudiation for long-lived PKI signatures more efficiently and with less overhead than trusted Time Stamping Services.

With FSEC, a bad actor is prevented from substituting a compromised digital asset from an improper author using a seemingly valid, substitute identity token. In the event of a verification failure, further information is available from the evidence container. A company can independently verify the integrity of the digital asset at a point in time of the company's choosing. A company can independently verify the integrity of the identity token (the author of the digital asset) at a point in time of the company's choosing. In the event that an identity token is revoked subsequent to the creation of its GSI signature, there is no potential for repudiation. Since the GSI signature is proof of identity prior to the time the identity token was reported as compromised, the revoked token can still be used to validate identity.

We claim:

1. A data security method comprising:

initializing an initial data structure having initial contents that include initial data, an initial rules portion indicating at least one condition on subsequent processing of the initial data, and an initial digital signature for at least a portion of the initial contents of the initial data structure that includes at least a portion of the initial data;

obtaining the initial digital signature by submitting the portion of the initial contents as an input record to a hash tree-based signing infrastructure that returns the data signature enabling recomputation of a logically uppermost value of the hash tree; and transferring the initial data structure from an initial entity to a subsequent entity, said subsequent entity being constrained in processing of the initial data structure by the at least one condition;

in which the digital signature includes recomputation parameters and a calendar value corresponding to a calendar period during which the digital signature was originally computed, such that an arbitrary subsequent test digital record is considered authenticated relative to the original portion of the contents if, using the recomputation parameters to logically recompute a hash tree path upward through the hash tree-based signing infrastructure, the same calendar value is attained as when it was originally computed, said signature thereby being independent of reliance on keys.

2. The method of claim 1, further comprising iteratively creating a corresponding data structure and obtaining and storing in the corresponding data structure a corresponding digital signature at each of a plurality of subsequent entities that receive the corresponding data structure from at least one respective previous entity, including the initial entity, such that all data structures and respective digital signatures of all entities in a provenance chain path are encoded and, using their respective digital signatures, verifiable.

3. The method of claim 2, further comprising verifying the contents of the data structure of at least one of the entities by recomputation of the calendar value in its respective signature.

4. The method of claim 3, further comprising verifying the contents without reference to an external database.

5. The method of claim 1, in which the at least one condition indicates whether subsequent entries are allowed to add data to any of their data structures that include the initial data.

6. The method of claim 1, in which the at least one condition indicates which entities may receive any data structure that includes the initial data.

7. The method of claim 1, in which the at least one condition indicates at least one time limit on when subsequent entities may receive and process any data structure that includes the initial data.

8. The method of claim 1, in which the at least one condition indicates whether at least one specified processing operation may be carried out.

9. A data security method comprising:
initializing an initial data structure having initial contents that include initial data, an initial rules portion indicating at least one condition on subsequent processing of the initial data, and an initial digital signature for at least a portion of the initial contents of the initial data structure that includes at least a portion of the initial data;
obtaining the initial digital signature by submitting the portion of the initial contents as an input record to a hash tree-based signing infrastructure that returns the data signature enabling recomputation of a logically uppermost value of the hash tree; and
transferring the initial data structure from an initial entity to a subsequent entity, said subsequent entity being constrained in processing of the initial data structure by the at least one condition; and
iteratively creating a corresponding data structure and obtaining and storing in the corresponding data structure a corresponding digital signature at each of a plurality of subsequent entities that receive the corresponding data structure from at least one respective previous entity, including the initial entity, such that all data structures and respective digital signatures of all entities in a provenance chain are encoded and, using their respective digital signatures, verifiable, said provenance chain comprising an ordered set of entities whose data structures have included the initial data.

10. The method of claim 9, in which, for at least one of the subsequent entities, the data structures of all previous entities are nested within the data structure created by the at least one subsequent entity.

11. The method of claim 9, in which the data structure of at least one of the subsequent entities comprises data added in addition to the initial data.

12. The method of claim 9, in which the data structure of at least one of the subsequent entries comprises non-nested information derived from the data structures of a plurality of previous entities.

13. The method of claim 9, further comprising, in at least one of the subsequent entries, dividing the respective data structure into a plurality of sub-structures, obtaining digital signatures for each sub-structure and transferring the sub-structures, together with their respective digital signatures, to different ones of immediately following entities.

14. The method of claim 9, further comprising, from the data structure in at least one of the subsequent entries, deleting the data in the data structure of at least one previous entity and obtaining the digital signatures for the data structure of the at least one subsequent entry after such deletion.

15. The method claim 9, in which
signatures that are generated by the hash-tree based signing infrastructure for digital inputs whose signature computation path passes through at least one computation system that incorporates a respective system identifier into its hashing computations identifiably encode the system identifier; and
the at least one condition specifies whether at least one computation system in the hash-tree based signing infrastructure may or may not participate in generating the digital signature of any of the entities whose data structures include the initial data.

16. The method of claim 9, further comprising displaying on a display a lineage map, which is a graphical representation of the provenance chain.

17. The method of claim 16, further comprising indicating on the displayed lineage map which of the entities represented in the lineage map have digital signatures that correctly correspond to their contents.

18. The method of claim 16, further comprising sensing user selection of a representation of an entity in the lineage map and displaying for the user a representation of the contents and digital signatures of the data structures included in the selected entity.

* * * * *